United States Patent
Majewski

(10) Patent No.: US 8,974,013 B2
(45) Date of Patent: Mar. 10, 2015

(54) METHOD FOR REGULATING A HYDRAULIC BRAKING SYSTEM OF A MOTOR VEHICLE

(71) Applicant: GM Global Technology Operations LLC, Detroit, MI (US)

(72) Inventor: Ralf Majewski, Trebur (DE)

(73) Assignee: GM Global Technology Operations LLC, Detroit, MI (US)

( * ) Notice: Subject to any disclaimer, the term of this patent is extended or adjusted under 35 U.S.C. 154(b) by 166 days.

(21) Appl. No.: 13/668,123

(22) Filed: Nov. 2, 2012

(65) Prior Publication Data
US 2013/0119751 A1     May 16, 2013

(30) Foreign Application Priority Data
Nov. 2, 2011 (DE) .......................... 10 2011 117 502

(51) Int. Cl.
*B60T 8/66* (2006.01)
*B60T 8/34* (2006.01)
*B60T 13/66* (2006.01)
*B60T 8/00* (2006.01)
*B60T 8/26* (2006.01)
*B60T 8/1755* (2006.01)

(52) U.S. Cl.
CPC . *B60T 8/34* (2013.01); *B60T 13/66* (2013.01); *B60T 8/00* (2013.01); *B60T 8/268* (2013.01); *B60T 8/1755* (2013.01); *B60T 2230/08* (2013.01)
USPC .................... 303/166; 303/189; 303/198

(58) Field of Classification Search
CPC ........... B60T 8/34; B60T 8/341; B60T 8/349; B60T 8/38; B60T 13/66; B60T 13/68; B60T 13/686
USPC ......... 303/166, 168, 171, 173, 189, 191, 198, 303/113.1, 113.4, 119.1
See application file for complete search history.

(56) References Cited

U.S. PATENT DOCUMENTS

| | | | | |
|---|---|---|---|---|
| 4,871,215 A | * | 10/1989 | Takayama ..................... | 303/191 |
| 5,895,098 A | * | 4/1999 | Stacey et al. .................. | 303/189 |
| 5,931,887 A | | 8/1999 | Hac | |
| 6,241,326 B1 | * | 6/2001 | Ferguson et al. ............. | 303/177 |
| 6,364,434 B1 | * | 4/2002 | Sway-Tin et al. ............. | 303/152 |

* cited by examiner

*Primary Examiner* — Thomas J Williams
(74) *Attorney, Agent, or Firm* — Ingrassia Fisher & Lorenz, P.C.

(57) ABSTRACT

A method for controlling a hydraulic braking system of a motor vehicle is provided. The method includes determining the vehicle speed and comparing the vehicle speed with a predefinable critical vehicle speed. If the vehicle speed lies below the critical vehicle speed, the method includes determining a required brake pressure or a brake pressure present in the braking system and comparing the brake pressure with a predefinable critical brake pressure. The method includes if the brake pressure lies below the critical brake pressure, blocking the buildup of a brake pressure in wheel brakes used for braking vehicle wheels of a vehicle rear axle.

17 Claims, 2 Drawing Sheets

METHOD FOR REGULATING A HYDRAULIC BRAKING SYSTEM OF A MOTOR VEHICLE

CROSS-REFERENCE TO RELATED APPLICATION

This application claims priority to German Patent Application No. 10 2011 117 502.8, filed Nov. 2, 2011, which is incorporated herein by reference in its entirety.

TECHNICAL FIELD

The present disclosure relates to a method for regulating a hydraulic braking system of a motor vehicle when reversing, a hydraulic braking system suitably adapted for carrying out the method, and a motor vehicle with such a hydraulic braking system.

BACKGROUND

Modern motor vehicles are increasingly being fitted with electric vehicle dynamics control systems, which serve to stabilize the vehicle in critical driving situations. Such systems intervene in the braking force distribution of the wheel brakes and enable individual-wheel control of the braking force at the vehicle wheels, for example, in order to produce a yaw moment, which stabilizes the vehicle. Vehicle dynamics control systems have been already been described in many occasions in the literature. Merely as an example, reference is made to U.S. Pat. No. 5,931,887. The term ESC (Electronic Stability Control) is usually used for this in professional circles.

Motor vehicles usually have a hydraulic braking system, in which a braking moment to brake the vehicle wheels can be produced in hydraulically controllable wheel brakes. Here the brake pressure is built up, for example, by a brake cylinder connected to the wheel brakes, where the brake pressure can be preset by means of a brake pedal connected to the brake cylinder.

Now during a gentle braking while slowly reversing, an unpleasant brake noise can occur. This is caused by low-frequency vibrations in the wheel brakes, which are produced by the braking intervention for example in the brake discs. However, this noise generally only occurs at relatively low braking moments since a stronger braking intervention counteracts the generation of vibrations.

In order to avoid braking noise during slow reversing, vibration or noise dampers may be mounted on the brake caliper, which are intended to absorb the vibrations accompanying the braking intervention. However, the installation of vibration dampers requires assembly time and incurs appreciable material and assembly costs. In addition, the installation may lead to installation space problems since under the normally restricted space conditions at the wheel brakes, vibration dampers may hit against the neighboring wheel arches. In addition, the use of vibration dampers on the wheel brakes is not permitted in all countries. Accordingly, it may be desirable to provide an improved hydraulic braking system of a motor vehicle. In addition, other objects, desirable features and characteristics will become apparent from the subsequent summary and detailed description, and the appended claims, taken in conjunction with the accompanying drawings and this background.

SUMMARY

Accordingly, in one exemplary embodiment, the present disclosure provides a hydraulic braking system in which the generation of a brake noise during gentle braking while slowly reversing is avoided.

According to various exemplary embodiments of the present disclosure, a method for regulating a hydraulic braking system of a motor vehicle during reversing is also disclosed.

The hydraulic braking system in one exemplary embodiment comprises a plurality of wheel brakes which are each assigned to a vehicle wheel of the front and rear axle and serve to brake the vehicle wheel. The wheel brakes can be equipped in a conventional manner and for example, each comprise a brake caliper, which can be brought into braking intervention with a brake disc. The braking system further comprises an actuating device for actuation by the driver, which typically comprises a brake pedal.

The braking system further comprises a braking unit, which is configured to produce a braking moment or a brake pressure by hydraulic fluid in the wheel brakes. The braking unit is coupled to the actuating device such that a brake pressure in the wheel brakes can be set optionally by the actuating device. The braking unit is typically designed as a brake cylinder, which is coupled hydraulically to the wheel brakes by means of hydraulic lines so that the wheel brakes can be acted upon with hydraulic fluid to produce a braking moment.

The hydraulic braking system further comprises a controllable or regulatable hydraulic unit switched between braking unit and wheel brakes, which is configured so that brake pressures produced at the wheel brakes can be varied individually for the wheels with respect to a brake pressure predefined by the actuating device. The hydraulic unit is connected to an electronic control/regulating unit for the control or regulation thereof The method according to an exemplary embodiment of the present disclosure is used for regulating a hydraulic braking system when reversing, wherein a braking process is to be initiated by requesting a brake pressure so that a brake pressure is only built up in the braking system and the vehicle is not yet braked or a (possibly increasing or decreasing) brake pressure is present in the braking system so that the motor vehicle is already braked.

The method according to the present disclosure for controlling a hydraulic braking system during reversing comprises:

A): The vehicle speed is determined during reversing and compared with a predefinable critical vehicle speed. If the vehicle speed lies below the critical vehicle speed, B1) is implemented. If the vehicle speed at least corresponds to the critical vehicle speed, alternatively B2) is implemented.

B1): A required brake pressure or a brake pressure present in the braking system is determined. This comprises the brake pressure predefined by the actuating device or requested, which is generated or is to be generated by the braking unit (e.g. main braking cylinder). The determined brake pressure is then compared with a predefinable critical brake pressure, wherein C1) is implemented if the brake pressure lies below the critical brake pressure or C2) is implemented if the brake pressure at least corresponds to the critical brake pressure.

B2): A), above, is repeated.

C1): This is implemented when both the vehicle speed lies below the critical vehicle speed and the brake pressure lies below the critical brake pressure, the buildup of a brake pressure in wheel brakes used for braking vehicle wheels of the vehicle rear axle is blocked. On the other hand, the buildup of a brake pressure in wheel brakes used for braking the vehicle wheels of the vehicle front axle is not blocked.

C2): A), above, is repeated.

The method according to the present disclosure therefore blocks the buildup of a braking moment in the wheel brakes of the vehicle wheels of the vehicle rear axle during slow, gently braked reversing so that an undesirable braking noise cannot be produced. This can be achieved in a cost-effective manner by mere regulating intervention in the controllable hydraulic braking system, so that in one example, in motor vehicles having a built-in vehicle dynamics control system, no specific devices (vibration dampers) must be installed to inhibit vibrations produced in the wheel brakes. Merely a corresponding programming device of the controller of the hydraulics unit is required. In one example, existing motor vehicles can be retrofitted with a vehicle dynamics control system for implementing the method according to the present disclosure.

According to one exemplary embodiment of the method according to the present disclosure, in the above method instead of C1), the following D), E1) and E2) are implemented:

D): The wheel speeds of all the vehicle wheels of the motor vehicle are determined and compared with one another, wherein E1) is implemented if the wheel speeds of the vehicle wheels are the same as one another, or E2) is implemented if the wheel speeds of the vehicle wheels are different.

E1): As in C1), the buildup of a brake pressure in wheel brakes used for braking the vehicle wheels of the vehicle rear axle is blocked. On the other hand, the buildup of a brake pressure in wheel brakes used for braking the vehicle wheels of the vehicle front axle is not blocked.

E2): A), above, is repeated.

By means of this measure, it can advantageously be achieved that if wheel slip occurs at one or more vehicle wheels, the braking moment at the wheel brakes of the rear wheels is not blocked. Typically wheel slip occurs on an icy roadway, in one example, when this is sloping. In this case, it is desirable to accept a braking noise and also provide wheel braking for this at the vehicle wheels of the rear axle.

According to another exemplary embodiment of the method according to the present disclosure, in the above method instead of C1) or instead of E1), the following are implemented:

F): A brake pressure gradient resulting from the time variation of a required brake pressure or a brake pressure present in the braking system is determined The determined brake pressure gradient is then compared with an (optionally) predefinable or predefined critical brake pressure gradient. G1) is implemented if the brake pressure gradient lies below the critical brake pressure gradient. G2) is implemented if the brake pressure gradient at least corresponds to the critical brake pressure gradient.

G1): As in C1), the buildup of a brake pressure in wheel brakes used for braking the vehicle wheels of the vehicle rear axle is blocked. On the other hand, the buildup of a brake pressure in wheel brakes used for braking the vehicle wheels of the vehicle front axle is not blocked.

G2): A), above, is repeated.

As a result of this measure, it can advantageously be achieved that in the event of a braking with substantially increasing braking moment (e.g. full braking), a blocking of the buildup of a brake pressure in the wheel brakes of the rear wheels does not take place even when there is an initially still low brake pressure in the braking system which lies below the critical brake pressure but increases substantially.

In the method according to the present disclosure, the vehicle speed during reversing is compared with an optionally predefinable critical vehicle speed, where the critical vehicle speed for the definition of a slow reversing in the sense of the present disclosure is fundamentally determined on the basis of that speed at which typically no more braking noise occurs. The critical speed is usually dependent on the type of vehicle. For example, but not necessarily, the critical speed lies in the range of more than about 0 km/h up to a maximum of about 20 km/h, in one example, in the range of more than about 0 km/h up to a maximum of about 10 km/h, and in one example, in the range of more than about 0 km/h up to a maximum of about 5 km/h (walking pace).

In the method according to the present disclosure, the brake pressure in the braking system during reversing is compared with an optionally predefinable critical brake pressure, where the critical brake pressure is fundamentally determined on the basis of that brake pressure at which typically no more braking noise occurs. The critical brake pressure is usually dependent on the type of vehicle. For example, the critical brake pressure can lie in the range of more than about 0% and less than about 20%, in one example in the range of more than about 0% and less than about 10%, and in one example in the range of more than about 0% and less than about 5% of a maximum brake pressure that can be produced in the braking system (full braking).

In the method according to the present disclosure, the brake pressure gradient of the brake pressure requested or present in the braking system is compared with an optionally predefinable critical brake pressure gradient where the critical brake pressure gradient is fundamentally determined on the basis of a brake pressure gradient which occurs, for example, during full braking. Consequently, the critical brake pressure gradient depends on the design of the braking system and is usually dependent on the vehicle type. For example, the critical brake gradient is about 50 bar per second (bar/s), whereby a control/regulation of the braking system suitable for many motor vehicles in this regard can be achieved.

The present disclosure also extends to a hydraulic braking system of a motor vehicle, in which the electronic control device is adapted from the programming point of view for implementing the method according to the present disclosure.

The present disclosure further extends to a motor vehicle which is equipped with a hydraulic braking system according to the present disclosure.

A person skilled in the art can gather other characteristics and advantages of the disclosure from the following description of exemplary embodiments that refers to the attached drawings, wherein the described exemplary embodiments should not be interpreted in a restrictive sense.

BRIEF DESCRIPTION OF THE DRAWINGS

The various embodiments will hereinafter be described in conjunction with the following drawing figures, wherein like numerals denote like elements, and wherein.

DETAILED DESCRIPTION

The following detailed description is merely exemplary in nature and is not intended to limit the present disclosure or the application and uses of the present disclosure. Furthermore, there is no intention to be bound by any theory presented in the preceding background or the following detailed description.

Figure 1:
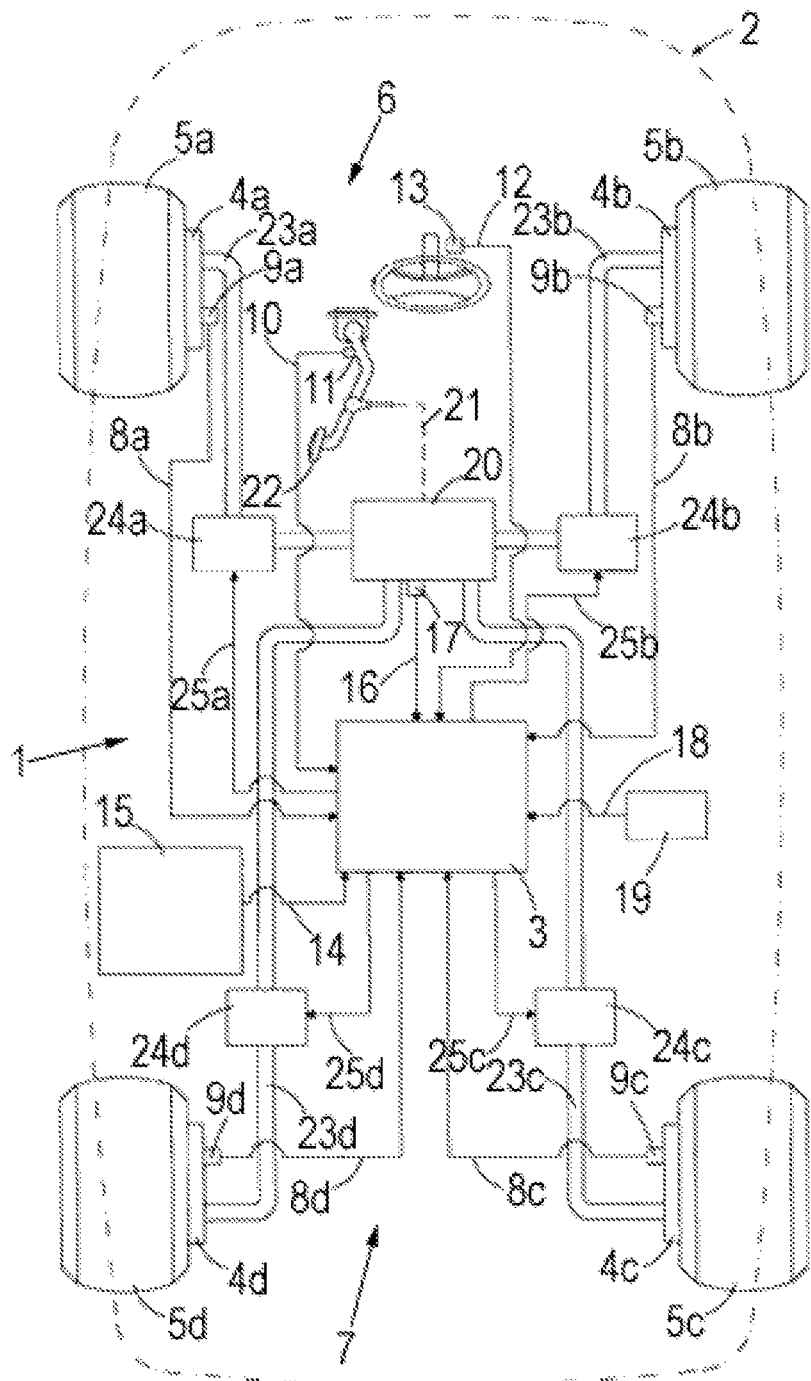
FIG. 1 shows a schematic view to illustrate an exemplary regulated hydraulic braking system of a motor vehicle.

FIG. 1 is first considered, wherein a braking system, designated overall with the reference number 1, of a (passenger) motor vehicle 2 having an integrated electronic stability control (ESC) system is illustrated by means of a schematic diagram. The regulated hydraulic braking system 1 comprises a microprocessor-based control device 3 for controlling/regulating wheel brakes 4a-4d of vehicle wheels 5a-5d. The two front vehicle wheels 4a, 4b are connected to a front axle 6, the two rear vehicle wheels 5a, 5b are connected to a rear axle 7 of the motor vehicle 2, which are not shown in detail in each case. The control device 3 receives via data lines 8a-8d wheel speed signals from respective speed sensors 9a-9d of the vehicle wheels 5a-5d. Furthermore, the control device 3 receives a brake pedal distance signal from a brake pedal distance sensor 11 via a data line 10, a steering wheel angle signal from a steering wheel angle sensor 13 via a data line 12, a yaw rate signal from a yaw rate sensor 15 via a data line 14, a main brake cylinder pressure signal from a pressure sensor 17 via a data line 16, and a lateral acceleration signal from a lateral acceleration sensor 19 via a data line 18. The sensors as such are familiar to the person skilled in the art so that they need not be discussed in detail here.

In the hydraulic braking system 1, a braking moment can be generated hydraulically by a (main) brake cylinder 20 via hydraulic lines 23a-23d in the wheel brakes 4a-4d, the wheel brakes 4a-4d being acted upon by hydraulic fluid with a brake pressure. The brake cylinder 20 is connected via a data line 21 to a brake pedal 22, through which, depending on the position of the brake pedal 20, a corresponding brake pressure can be optionally produced in the braking system 1.

In addition, an actuator 24a-24d is integrated in each hydraulic line 23a-23d, through which the brake pressure predefined by the brake cylinder 20 at the wheel brakes 4a-4d can be varied individually for each wheel. The actuators 24a-24d jointly form a hydraulic unit. The actuators 24a-24d can be individually controlled or regulated via data lines 25a-25d from the control device 3.

The control device 3 is adapted for regulating the driving dynamics from the program engineering viewpoint. In certain driving states, for example, when blocking a wheel or where there is a strong sideways slope of the vehicle structure when traveling around a bend, the control device 3 can modify the normal braking of the vehicle wheels 5a-5d through an individual braking intervention for each wheel via the hydraulic units 24a-24d in order to obtain a desired driving behavior in this way. In this case, the braking moment or the brake pressure in individual wheel brakes 4a-4d is specifically increased or decreased.

Figure 2:
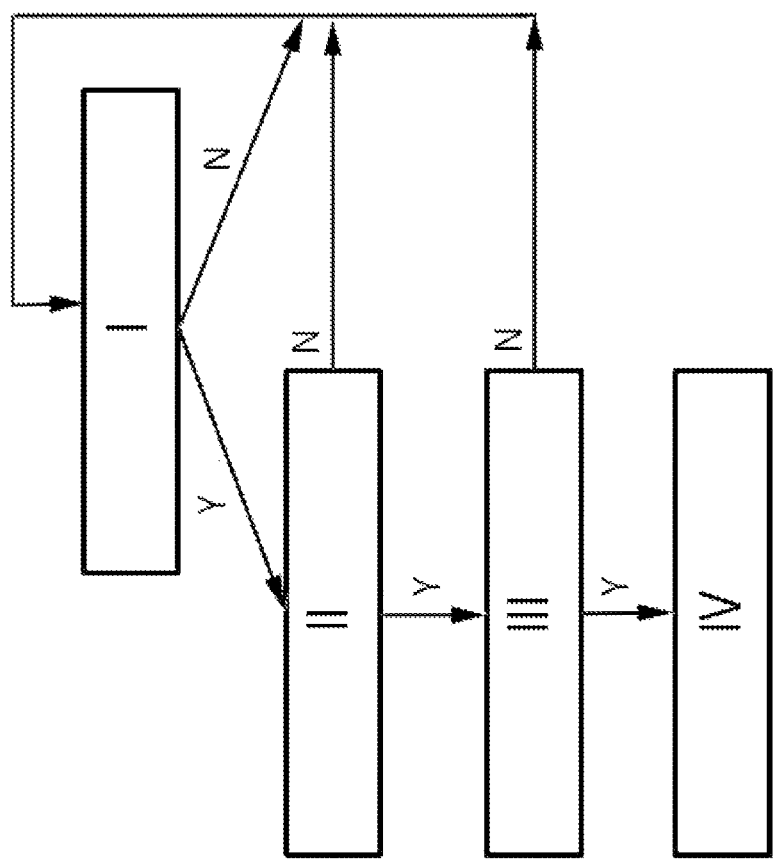
FIG. 2 shows a schematic sequence plan of an exemplary embodiment of the method according to the present disclosure.

The control device 3 of the braking system 1 from FIG. 1 is adapted for implementing the method according to the present disclosure from the program engineering viewpoint, where in one example the method illustrated in the sequence plan of FIG. 2 is implemented.

The method is implemented when reversing, in one example braked reversing, so that the method described subsequently is usually preceded by an activation step in which it is checked whether a reversing exists. This can be accomplished, for example, by interrogating a parameter stored in the motor controller which, for example, specifies that reverse gear is engaged. An evaluation of the wheel speed signals of the speed sensors 9a-9d of the vehicle wheels 5a-5d, which can also reveal a reversing is also feasible. In addition, it can be checked for the activation step whether a braking moment is required for a braking and/or whether a brake pressure is already present in the braking system. This can, for example, be accomplished on the basis of an evaluation of the brake pedal distance signal of the brake pedal distance sensor 11 and/or of the main brake cylinder pressure signal of the pressure sensor 17 (existence or buildup of a brake pressure in the braking system).

If the method was activated, it is typically implemented as long as the reversing lasts and optionally as long as a brake moment is required or exists in the braking system, where certain conditions need to be satisfied for the subsequently described blocking of the buildup of brake pressure in the wheel brakes of the rear wheels. For this purpose a periodic evaluation of the signals interrogated for activation of the method is also made during implementation of the method, the method being ended as soon as reversing is ended and/or no braking moment is required or is present in the braking system.

When the method is activated, firstly the vehicle speed (V) is determined during reversing which can be accomplished on the basis of the wheel speed signals of the speed sensors 9a-9d of the vehicle wheels 5a-5d. The determined speed (V) is compared with a predefinable or predefined vehicle speed (Cal1) stored in the control device 3. In this case, for example, the interrogation: "is the determined speed lower than the critical speed (V<Cal 1)?" is examined. This is characterized in the sequence diagram of FIG. 2 with "I".

If the determined vehicle speed at least corresponds to the critical vehicle speed, i.e. if the interrogation yields the result "no" (N), which means that there is no slow reversing in the sense of the present disclosure, the method goes over into a renewed determination of the vehicle speed.

In the alternative case when the determined vehicle speed lies below the critical vehicle speed, i.e. if the interrogation yields the result "yes" (Y), which means that there is a slow reversing in the sense of the present disclosure, a brake pressure p that is required and/or present in the braking system is determined, which can be accomplished on the basis of the brake pedal distance signal of the brake pedal distance sensor 11 and/or the main brake cylinder pressure signal of the pressure sensor 17. The determined brake pressure p is compared with a predefinable or predefined critical brake pressure (Cal2) stored in the control device 3. In this case, for example, the interrogation: "is the determined brake pressure lower than the critical brake pressure (p<Cal2)?" is examined. This is characterized in the sequence diagram of FIG. 2 by "II".

If the determined brake pressure at least corresponds to the critical brake pressure, i.e. if the interrogation yields the result "no" (N), which means that there is no gentle braking in the sense of the present disclosure, the method goes over into a renewed determination of the vehicle speed.

In the alternative case when the determined brake pressure lies below the critical brake pressure, i.e. if the interrogation yields the result "yes" (Y), which means that there is a gentle braking in the sense of the present disclosure, the wheel speeds are determined during the reversing, which can be accomplished on the basis of the wheel speed signals of the speed sensors 9a-9d of the vehicle wheels 5a-5d. The determined wheel speeds are then compared with one another, where for example the interrogation: "are the wheel speeds the same?" is examined. This is characterized in the sequence diagram from FIG. 2 by "III".

If the wheel speeds are different, i.e. if the interrogation yields the result "no" (N), which means that at least one vehicle wheel is undergoing wheel slip, the method goes over into a renewed determination of the vehicle speed.

In the alternative case when the wheel speeds are the same, i.e. when the interrogation yields the result "yes" (Y), which means that no vehicle wheel is undergoing wheel slip, the actuators 24a, 24d block the buildup of a brake pressure in the wheel brakes 4c, 4d used to brake the vehicle wheels 5c, 5d of the vehicle rear axle 7 so that no braking effect is present at the rear wheels. This is characterized by "IV" in the sequence diagram of FIG. 2. Since in contrast to this, the buildup of a brake pressure in the wheel brakes 4a, 4b of the two vehicle wheels 5a, 5b of the front axle 6 is allowed, the motor vehicle 2 experiences a braked reversing in which exclusively the vehicle wheels 5a, 5b of the front axle 6 are braked. The formation of an unpleasant braking noise during slow reversing can thus be avoided.

Although this is not shown in the sequence diagram, before blocking the buildup of a brake pressure in the wheel brakes 4c, 4d of the vehicle rear axle 7, it would be possible to additionally check whether the temporal brake pressure gradient of the brake pressure that is required or that builds up in the braking system during braking lies below a predefinable or predefined brake pressure gradient. If this is correct, the buildup of a brake pressure in the wheel brakes 4c, 4d of the vehicle rear axle 7 is blocked, if not, the method goes over into a renewed determination of the vehicle speed.

If the method according to the present disclosure is activated, either the buildup of a brake pressure in the wheel brakes 4c, 4d of the vehicle rear axle 7 is blocked, which requires the existence of several conditions, or the method goes over into a renewed determination of the vehicle speed which takes place as long as a reversing is present and optionally a braking moment is required or a brake pressure is present in the braking system. Since the buildup of a brake pressure in the wheel brakes of the rear wheels is blocked, the occurrence of a possibly unpleasant feeling for the driver in the brake pedal during the regulation of the brake pressure distribution in the braking system according to the present disclosure can be avoided.

The present disclosure discloses a method in which during a slow reversing the buildup of a braking moment exclusively in the vehicle wheels of the vehicle rear axle is blocked, thereby counteracting the formation of an unpleasant braking noise. In the event that wheel slip occurs, for example, on an icy roadway, generally no intervention in the braking force distribution of the wheel brakes is made. The same applies with a high temporal brake pressure gradient, for example during full braking.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the present disclosure in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the present disclosure as set forth in the appended claims and their legal equivalents.

What is claimed is:

1. A method for controlling a hydraulic braking system of a motor vehicle during reversing, which comprises:
    A) determining a vehicle speed and comparing the vehicle speed with a predefinable critical vehicle speed;
    B1) determining, when the vehicle speed lies below the critical vehicle speed, a required brake pressure or a brake pressure present in the braking system and comparing the required brake pressure or the brake pressure present in the braking system with a predefinable critical brake pressure;
    B2) repeating, when the vehicle speed at least corresponds to the critical vehicle speed, A);
    C1) blocking, when the brake pressure lies below the critical brake pressure, the buildup of a brake pressure in wheel brakes used for braking vehicle wheels of a vehicle rear axle; and
    C2) repeating, when the brake pressure at least corresponds to the critical brake pressure, A).

2. The method according to claim 1, in which instead of C1), the following are implemented:
    D) determining wheel speeds of all vehicle wheels of the motor vehicle and comparing the wheel speeds;
    E1) if the wheel speeds of the vehicle wheels are the same as one another, blocking the buildup of a brake pressure in wheel brakes used for braking vehicle wheels of a vehicle rear axle; and
    E2) if the wheel speeds of the vehicle wheels are different, repeating A).

3. The method according to claim 1, in which instead of C1), the following are implemented:
    F) determining a brake pressure gradient resulting from the time variation of a required brake pressure or a brake pressure present in the braking system and comparing the brake pressure gradient with a critical brake pressure gradient;
    G1) if the brake pressure gradient lies below the critical brake pressure gradient, blocking the buildup of a brake pressure in wheel brakes used for braking vehicle wheels of a vehicle rear axle; and
    G2) if the brake pressure gradient at least corresponds to the critical brake pressure gradient, repeating A).

4. The method according to claim 2, in which instead of E1), the following are implemented:
    F) determining a brake pressure gradient resulting from the time variation of a required brake pressure or a brake pressure present in the braking system and comparing the brake pressure gradient with a critical brake pressure gradient;
    G1) if the brake pressure gradient lies below the critical brake pressure gradient, blocking the buildup of a brake pressure in wheel brakes used for braking vehicle wheels of a vehicle rear axle; and
    G2) if the brake pressure gradient at least corresponds to the critical brake pressure gradient, repeating A).

5. The method according to claim 1, in which the critical vehicle speed lies below about 20 km/h.

6. The method according to claim 1, in which the critical brake pressure lies below about 20% of a maximum brake pressure under full braking.

7. The method according to claim 3, in which the critical brake gradient pressure is about 50 bar/s.

8. A hydraulic braking system of a motor vehicle, which comprises:
    a plurality of wheel brakes for braking a plurality of vehicle wheels of a vehicle front axle and a vehicle rear axle;
    an actuating device for actuating the hydraulic braking system;
    a braking unit connected to the actuating device for setting a brake pressure predefinable by the actuating device in the plurality of wheel brakes;
    a hydraulic unit switched between the braking unit and the plurality of wheel brakes through which brake pressures generated at the plurality of wheel brakes is individually variable for each one of the plurality of wheels with respect to a brake pressure predefined by the actuating device; and
    an electronic control device for controlling the hydraulic unit, wherein the electronic control device determines a vehicle speed and compares the vehicle speed with a predefinable critical vehicle speed, and when the vehicle speed lies below the critical vehicle speed, determines a required brake pressure or a brake pressure present in the braking system and compares the required brake pressure or the brake pressure present in the braking system with a predefinable critical brake pressure, and the electronic control device blocks the buildup of a brake pressure in wheel brakes used for braking the plurality of vehicle wheels of the vehicle rear axle when the brake pressure lies below the critical brake pressure.

9. The brake system according to claim 8, wherein if the brake pressure lies below the critical brake pressure, the electronic control device determines wheel speeds of all the vehicle wheels of the motor vehicle and compares the wheel speeds and if the wheel speeds of the vehicle wheels are the same as one another, blocks the buildup of a brake pressure in wheel brakes used for braking the plurality of vehicle wheels of the vehicle rear axle.

10. The brake system according to claim 8, wherein if the brake pressure lies below the critical brake pressure, the electronic control device determines a brake pressure gradient resulting from the time variation of the required brake pressure or the brake pressure present in the braking system and compares the brake pressure gradient with a critical brake pressure gradient, and if the brake pressure gradient lies below the critical brake pressure gradient, blocks the buildup of a brake pressure in wheel brakes used for braking the plurality of vehicle wheels of the vehicle rear axle.

11. The brake system according to claim 10, in which the critical brake gradient pressure is about 50 bar/s.

12. The brake system according to claim 8, wherein if the brake pressure lies below the critical brake pressure, the electronic control device determines the wheel speeds of all the vehicle wheels of the motor vehicle and compares the wheel speeds, and if the wheel speeds of the vehicle wheels are the same as one another, determines a brake pressure gradient resulting from the time variation of the required brake pressure or the brake pressure present in the braking system and compares the brake pressure gradient with a critical brake pressure gradient.

13. The brake system according to claim 12, wherein if the brake pressure gradient lies below the critical brake pressure gradient, the electronic control device blocks the buildup of a brake pressure in wheel brakes used for braking the plurality of vehicle wheels of the vehicle rear axle.

14. The brake system according to claim 8, in which the critical vehicle speed lies below about 20 km/h.

15. The brake system according to claim 8, in which a critical brake pressure lies below about 20% of a maximum brake pressure under full braking.

16. A motor vehicle, comprising:
a hydraulic braking system including a plurality of wheel brakes for braking a plurality of vehicle wheels of a vehicle front axle and a vehicle rear axle;
an actuating device for actuating the hydraulic braking system;
a braking unit connected to the actuating device for setting a brake pressure predefinable by the actuating device in the plurality of wheel brakes;
a hydraulic unit switched between the braking unit and the plurality of wheel brakes through which brake pressures generated at the plurality of wheel brakes is individually variable for each one of the plurality of wheels with respect to a brake pressure predefined by the actuating device;
an electronic control device for controlling the hydraulic unit,
wherein the electronic control device determines a vehicle speed and compares the vehicle speed with a predefinable critical vehicle speed, when the vehicle speed lies below the critical vehicle speed, determines a required brake pressure or a brake pressure present in the braking system and compares the required brake pressure or the brake pressure present in the braking system with a predefinable critical brake pressure, and the electronic control device blocks the buildup of a brake pressure in wheel brakes used for braking the plurality of vehicle wheels of the vehicle rear axle when the brake pressure lies below the critical brake pressure.

17. The motor vehicle according to claim 16, in which the critical vehicle speed lies below about 20 km/h.

* * * * *